March 6, 1962

R. C. MIERENDORF ET AL 3,024,354

CONTROL CIRCUIT

Filed Dec. 2, 1958

INVENTOR.
ROBERT C. MIERENDORF
CHARLES F. MEYER
BY

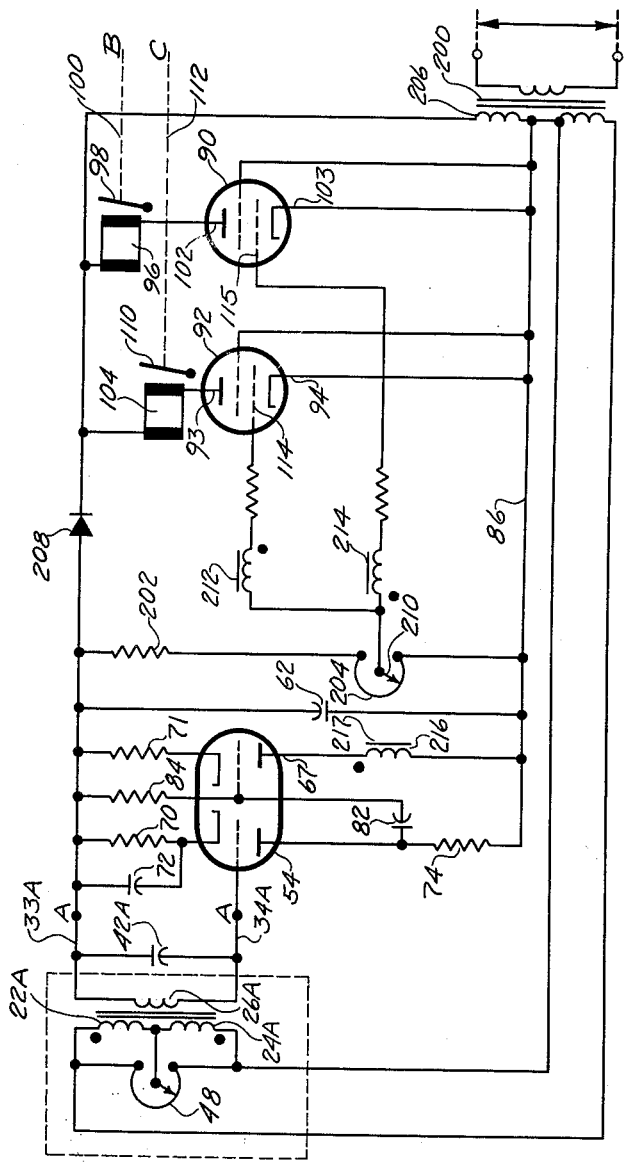
FIG. 3
INVENTOR.
ROBERT C. MIERENDORF
CHARLES F. MEYER
BY

United States Patent Office 3,024,354
Patented Mar. 6, 1962

3,024,354
CONTROL CIRCUIT
Robert C. Mierendorf and Charles F. Meyer, Wauwatosa, Wis., assignors to Square D Company, Detroit, Mich., a corporation of Michigan
Filed Dec. 2, 1958, Ser. No. 777,780
13 Claims. (Cl. 219—131)

This invention relates to positioning devices and is more particularly concerned with an apparatus and circuit which will maintain an operator at a predetermined distance from a worksurface.

In application Serial No. 609,683, filed Oct. 21, 1958, now Patent No. 2,915,699, of which application this application is a continuation in part, a metal detector is described as having a pair of driving coils each of which are energized by alternating current. The coils are arranged to induce voltages in a pickup coil so the induced voltages are normally shifted slightly from direct phase opposition by a predetermined angle $\theta$. The voltages thus induced in the pickup coil are used as a resultant signal. When an object having ferromagnetic properties is introduced into the field of one of the driving coils, a decrease in reluctance occurs between that driving coil and the pickup coil, resulting in an increase in the amplitude of the voltage induced in the pickup coil by that driving coil. This change in amplitude will cause a phase change in the resultant of the vector sum of the two voltages induced in the pickup coil by both driving coils to provide a phase change in the output signal of the pickup coil, which signal may then be amplified, if desired, before it is impressed on the phase shift detector that has an output circuit arranged to establish a control function in response to the ferromagnetic metal which was originally moved into proximity with the detector.

An additional improvement in the structure of the detector is set forth in application Serial No. 715,450, filed February 14, 1958, now Patent No. 2,971,151, as a continuation of the aforementioned application. In the detector shown in the latter filed application, the tuning of the detector is accomplished by a ferromagnetic bolt which is positioned in the epoxy resin wherein the coils of the device are potted. This ferromagnetic bolt is used to adjust the amplitude of the voltage induced in the pickup coil from one of the driving coils.

While the detector structure described in either of the aforementioned applications may be utilized in the circuit and apparatus which will be hereinafter described, it has been found that the apparatus described in the latter filed application has proven to be most successful. When the detector structure is employed in the apparatus and circuit according to the present invention, the detector is mounted in fixed relation on an operator and in close proximity to a worksurface which will have an operation performed thereon by the operator. The worksurface itself has ferromagnetic properties to provide a means for reducing the reluctance of the flux paths in one of the driving paths and thus provide a resultant signal in the pickup coil. The tuning of the driving coils of the detector is adjusted so the pickup coil will have a zero output when the detector is at a predetermined distance from the worksurface. When the predetermined distance is increased, the effect of the metallic worksurface upon the driving coil adjacent the worksurface is reduced and a resultant signal of one polarity will be induced in the pickup coil. On the other hand, when the metal detector is moved to a distance less than the predetermined distance, the worksurface will decrease the reluctance imparted by the driving coil to the pickup coil and induce a voltage of opposite polarity in the pickup coil. The differences in the polarities indicated is detected by the circuit means and amplified therein to provide a voltage signal which controls either one of a pair of electronic switches which in turn control a pair of output circuits.

It is to be noted that the detector circuit differs from the circuits disclosed in the aforementioned specifications in that the circuit according to the present invention relies upon the induction of voltage signals of opposite polarities in the pickup coil whereas in the previously mentioned circuits, the circuits operate upon variations in phase shift of the voltage signal of the pickup coil. Further, it is to be appreciated that while the detector disclosed hereinafter is employed to position the electrodes of a welding apparatus, it is readily apparent the apparatus may be used to position operators other than welding electrodes, as for example, tools which machine the worksurface, etc.

It is an object therefore of the present invention to provide a circuit and apparatus for controlling the position of an operator so the operator will constantly be positioned a predetermined distance from a work surface.

A further object of the present invention is to provide a compensating means for a metal detector so the detector may be employed in a field of external alternating current flux without being effected by the field.

Another object of the present invention is to provide a circuit and apparatus for controlling the position of an A.C. welding electrode which apparatus includes a magnetic detector which is responsive to the position of the worksurface being operated upon by the electrode and which detector is unaffected by the presence of the flux field generated by the flow of welding current in the electrode.

A still further object of the present invention is to provide a metal detector which will have an output whenever the detector is greater or less than a predetermined distance from a metal surface and to provide a means which is responsive to the output of the detector which means controls the energization of either one of a pair of output circuits which are connected to a means which controls the position of the metal detector.

In carrying out the above object it is another object to compensate the detector so the detector may be used in the presence of a strong external alternating current flux field such as is generated by an alternating current welder and to employ a saturab'e transformer in the control circuit so the thyratrons which control the output circuits will conduct at the beginning of the voltage wave of their anode supply and wherein the anodes of both thyratrons are supplied from the same secondary winding.

Further objects and features of the invention will be readily apparent to those skilled in the art from the specification and appended drawing illustrating certain preferred embodiments in which:

FIG. 3 represents a modified form of circuitry shown in FIG. 2.

Figure 1:
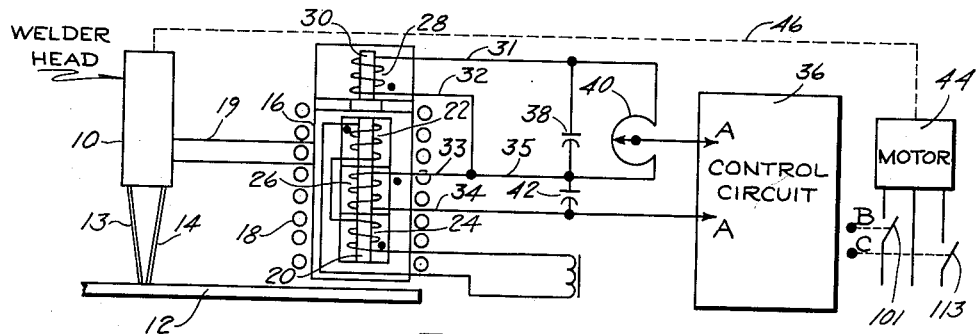
FIG. 1 illustrates the circuit and apparatus according to the present invention as utilized to maintain the position of a pair of alternating current welding electrodes relative to a worksurface.

In the drawings, FIG. 1 shows an arrangement for controlling the height of an operator 10 relative to a worksurface 12. The operator 10, shown as a welder head, is vertically movable and arranged to vertically position and feed a pair of welding electrodes 13 and 14 at a predetermined rate toward the worksurface to permit the electrodes to be consumed and deposit a layer of metal on the worksurface. In this connection it is to be noted that the positioning apparatus, which will be hereinafter described, is equally adapted for use with other apparatus than welders, as for example, it may be used with equal facility with cutting torches or tools which remove metal from the worksurface or with any other equipment where any predetermined distance is to be constantly maintained between the operator and the worksurface.

The apparatus controlling the vertical position of the welder head 10 relative to the worksurface 12 includes a metal detector 16, more fully described in the applications for patent mentioned supra. The detector 16 is here shown as having cooling coils 18 wrapped about its outer surface to relieve the heat generated therein by the welding electrodes. The detector 16 is mechanically connected to the welding head 10 by arm 19 and is spaced to have its core 20 positioned generally vertical at a predetermined distance from the worksurface 12. Surrounding the core are a pair of spaced driving coils 22 and 24 located on the opposite ends of the core 20. Spaced between the driving coils is the pickup coil 26. In the applications mentioned supra wherein it is also indicated that the detector 16 is tuned so that the respective fluxes induced in the core 20 by current flow in the driving coils 22 and 24 are opposed and displaced from 180° opposition by a predetermined angle θ, thereby causing an output signal voltage to be present in the pickup coil. As was explained in the application, when a metal surface is brought in the proximity of one of the driving coils, the reluctance of magnetic field in the vicinity of that coil is decreased, thereby causing that coil to induce a greater voltage in the pickup coil. The change in induction will cause the phase angle of the output voltage signal of the pickup coil to change which change is utilized as a control signal.

It is clearly apparent that the presence of the welding electrodes 13 and 14 will cause a very strong flux field to be present if the welding electrodes 13 and 14 are energized by alternating current. It has been discovered that the strength of this flux field will be sufficient to obliterate the signal from the pickup coil. When the apparatus is used with an alternating current welder it has been found that the presence of a compensating means, such as an additional compensating coil 28, may be used to compensate for the effect of the flux field generated by the welding electrodes 13 and 14. The coil 28 preferably is positioned on the magnetic core 30 which is axially aligned with core 20. The coil 28 has higher output voltage than the pickup coil 26. The output leads 31 and 32 of the compensating coil 28 and the output leads 33 and 34 are connected as shown to provide a signal at points AA of the control circuit 36 schematically shown in FIG. 1. The control circuit as used in FIG. 1 includes the portion to the right of the points AA in either of the circuits shown in FIGS. 2 and 3. The output leads 32 and 33 are connected to a common lead 35. Connected across the output leads 31 and 35 is a capacitor 38 and a potentiometer 40. Connected across the leads 34 and 35 is a capacitor 42. The capacitors 38 and 42 are used as filter capacitors to suppress the harmonic voltages and respectively will provide an initial predetermined phase displacement of the voltage generated within the compensating coil 28 and the pickup coil 26. As heretofore set forth, the output voltage of compensating coil 28 because of the flux field generated by electrodes 13 and 14, is slightly greater than the voltage generated within the pickup coil 26. The potentiometer 40 is used to balance these output voltages so they are equal. Thus as the coils 26 and 28 are subjected essentially to the same A.C. flux field and as the coils are connected so their outputs are in opposition, the effect of the A.C. welding field in coil 26 is eliminated. Therefore any variations in the predetermined distance between the detector 16 and the worksurface 12 will result in an output signal at points AA which is utilized in either one of the circuits shown in FIGS. 2 or 3 to control the operation of the motor 44 that is mechanically connected by the connection 46 to the welder head 10 to raise or lower the welder head in response to the signal generated by the metal detector 16.

Figure 2:
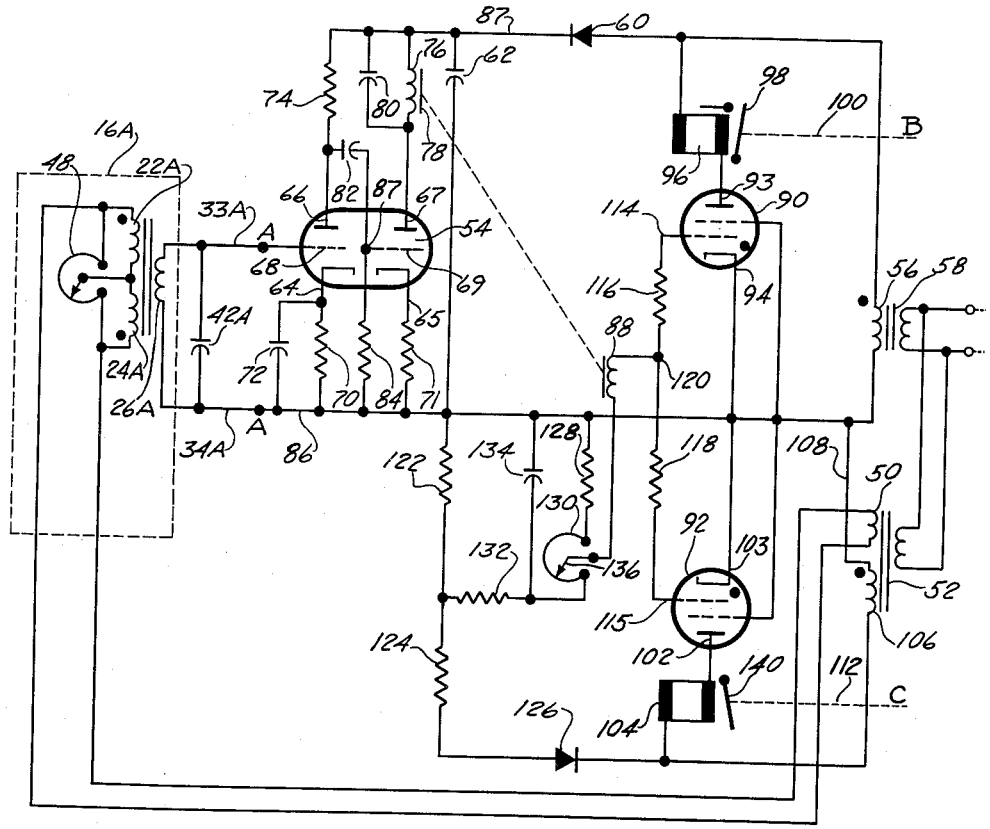
FIG. 2 is a schematic diagram showing the circuit which may be utilized in the apparatus shown in FIG. 1.

In FIG. 2 of the drawings, one form of a circuit which may be used to amplify the signals from the pickup coil and to utilize the amplified signals to control a pair of output circuits for controlling the rotation of the motor 44 is shown. In FIG. 2 the means for compensating for the effect of the A.C. flux field from the welding electrodes has been omitted as it is not necessary to the understanding of the circuit shown in FIG. 2. The numerical designations for the components in FIG. 2 which correspond to similar components in FIG. 1, each have the numerical designation as employed in FIG. 1 with the letter "A" added thereto as a suffix. Thus, the driving coils of the detector 16A are shown as 22A and 24A and the pickup coil is designated as 26A. As was previously mentioned in the applications mentioned supra, the voltages across the driving coils 22A and 24A may be adjusted by a potentiometer 48 which is in circuit with the driving coils 22A and 24A and a secondary winding 50 of a supply transformer 52. In the applications mentioned supra, the metal detector 16A is also provided with a tuning slug (not shown in the drawings), which is used to adjust the angle of opposition of the voltages induced by the driving coils 22A and 24A in the pickup coil 26A so the presence of a metal object in the magnetic field of one of the driving coils will cause a change in the phase angle of the voltage induced in the pickup coil 26A. The voltage signal from the pickup coil is filtered by means of a capacitor 42A which is shown as the capacitor 42 in FIG. 1 and which will filter the harmonic ripples on the voltage wave of the output signal of the pickup coil and provide an initial predetermined displacement of the phase of the voltage generated within the pickup coil 26A. The voltage output signal from the pickup coil 26A is amplified by a suitable amplifying means and used to selectively control a pair of output circuits. While any suitable amplifying means may be utilized, the amplifying means in FIGS. 2 and 3 includes a vacuum tube 54 which has its anode voltage supplied with direct current from the secondary winding 56 of transformer 58 through the diode 60. This direct current voltage from the transformer secondary 56 and the diode 60 is filtered by capacitor 62. The amplifying tube 54 includes the cathodes 64 and 65, anodes 66 and 67 and control grids 68 and 69. The cathodes 64 and 65 are connected through conventional cathode bias resistances 70 and 71 to a ground bus 86 which is connected to secondary winding 56. Connected in parallel with the resistance 70 in circuit with the cathode 64 is a filter capacitor 72. Connected in circuit between the anode 66 and a D.C. supply bus 87 is a plate load resistance 74. Connected in circuit between the anode 67 and the bus 87 is the primary winding 76 of the transformer 78. A filter capacitor 80 is connected in parallel circuit with the primary winding 76. The grid 68 which controls the current flow between the anode 66 and cathode 64 comprising the input side of the tube 54 is directly connected to the output lead 33A from one end of the pickup coil 26A. The cathode 64 is connected through the resistance 70 to the ground bus 86 which in turn is connected at point A to lead 34A which is connected to the other end of the pickup coil 26A. The grid 69 which controls the current flow between anode 67 and cathode 65 comprising the output side of tube 54 is connected to a junction 87 disposed between the one plate of a capacitor 82 and one end of a resistance 84. The other plate of capacitor 82 is connected to a junction between resistance 74 and anode 66. The other end of the resistance 84 is connected to the negative bus 86. The amplifier 54 will provide an amplified voltage signal. Whenever the voltage from the pickup coil 26A changes the current flow between anode 67 and cathode 65 will vary accordingly. This change in current is transmitted to the primary winding 76 of the transformer 78. In this connection it is to be noted that the transformer 78 is of the low resistance, high inductance type and that the bias provided by the grids 68 and 69 of tube 54 will cause the tube 54 to be overdriven electronically. Any change in the output of tube 54 will develop sharp voltage spikes in winding 88 of transformer 78. These spikes will be either positive or negative, depending on the direction of current change at the anode 67. In this connection it is to be noted that the driving coils 22A and 24A are wound so the voltages induced in the pickup coil 26A are opposed. Thus when the voltage induced by one of the driving coils predominates a positive peak output of transformer secondary 88 will occur when one end of transformer winding 56 is positive, i.e., on an $L_1$ polarity. When the voltage induced by the other driving coil predominates then the positive voltage peak of the transformer secondary 88 will occur when the other end of the transformer secondary 106 is positive, i.e., on an $L_2$ polarity. These peaks will occur at the voltage frequency of the transformer 52 and the occurrence of these positive peak voltages during opposite periods of polarity of the supply voltage is utilized in a circuit which will now be described to control a pair of thyratrons 90 and 92 or other suitable electronic switches used to control a pair of output circuits in a manner which will now be explained.

The thyratron 90 has an anode 93 and a cathode 94 with the anode 93 connected through an actuating coil of a relay 96 to a lead which extends to one of the terminals of the secondary winding 56 of transformer 58. The cathode 94 in turn is connected to the bus 86 which is connected to the other end of the winding 56. Thus the thyratron 90 is supplied with alternating current from the transformer 58 and when rendered conductive will cause the relay coil 96 to be energized to attract the armature 98 thereof. The armature is shown as having a mechanical connection 100 to a switch 101 in the circuit to the motor 44 as shown in FIG. 1.

The thyratron 92 is similarly provided with an anode 102 and a cathode 103. The anode 102 is connected in a series circuit including the actuating coil of a relay 104 and one end of a secondary winding 106 of a transformer 52. The cathode 103 is connected through bus 86 and lead 108 to the other end of the secondary winding 106. Thus the thyratron 92 is supplied with alternating current from the transformer winding 106 and will cause the relay 104 to be energized whenever the thyratron 92 is rendered conductive. The relay 104 is provided with an armature 110 which is mechanically connected by means 112 with the switch 113 in the circuit to motor 44. The switches 101 and 113 in the motor circuit when closed will respectively control the direction of rotation of a motor 44. The switches 101 and 113 may be provided with a suitable mechanical interlock means, not shown, to prevent simultaneous closing thereof.

The thyratrons 90 and 92 each have control grids 114 and 115 respectively and shield grids which are connected to the negative bus as shown. The grids 114 and 115 are tied together through series connected grid current limiting resistors 116 and 118 and a junction 120 located between the resistances 116 and 118. Connected to the junction 120 is a means which will normally provide a negative bias to normally bias the thyratrons 90 and 92 against conduction. This bias includes the series connected voltage dividing resistances 122 and 124 which are connected to be supplied from transformer secondary winding 106 through diode 126. Connected across the resistance 122 is a series circuit including a minimum fixed resistance 128 and a variable potentiometer resistance 130. The potentiometer 130 is adjustable to vary the voltage bias to grids 114 and 115. The resistance 132 and a capacitor 134 are utilized to filter the D.C. voltage from the secondary winding 106 and the diode 126 across the voltage divider. The junction 120 is connected in a circuit which includes the secondary winding 88 of the transformer 78 to a slider 136 of the potentiometer 130. Thus, whenever the transformer 78 delivers a positive voltage peak, the voltage of both control grids 114 and 115 will change. In this connection it is to be noted that the A.C. anode voltages of thyratrons 90 and 92 are exactly opposite in phase and are at the same frequency as the peaks produced by transformer winding 88. Thus, if the peaks as produced by the transformer winding 88 occur during and are positive when the anode 93 voltage is positive, the thyratron 90 will be rendered conductive to energize relay 96 and close switch 101 to cause the motor to operate to rotate in one direction. On the other hand, if the peaks produced by the winding 88 occur during the period when the voltage on anode 102 is positive, then the tube 92 will be rendered conductive and relay 104 will be energized to close switch 113 so as to cause the motor 44 to rotate in the opposite direction. In this connection it is also to be noted that the parameters of the circuits are selected so that the peaks from transformer 88 occur early during the half cycle during which the respective anodes are positive so that the tubes 90 and 92 will conduct substantially full half cycles.

In FIG. 3 of the drawings another form of the control circuit is illustrated wherein like numerals refer to like parts and functions thereof as previously described for the embodiment shown in FIG. 2.

In FIG. 3 a single transformer 200 replaces the pair of transformers 58 and 52, employed in FIG. 2. In this embodiment the grids 114 and 115 are normally biased to prevent conduction of tubes 92 and 90 respectively by a common bias means. The bias means comprises a voltage divider formed by a fixed resistance 202 and a potentiometer resistance 204. The voltage divider is energized with direct current by a secondary winding 206 of transformer 200 and a diode 208. The slider 210 of the potentiometer resistance 204 is used to adjust the bias potential and is connected through a pair of circuits to the grids 114 and 115. Included in the circuits are the secondary windings 212 and 214 of a transformer 216 which has a single primary winding 217 in circuit with the anode 67 of the amplifying means including electronic vacuum tube 54. The diode 208 which is in circuit with the secondary winding 206 is also arranged to rectify the current output of winding 206 to provide direct current for the amplifying means 54. As was previously recited, the primary winding 217 is energized in response to variations in output of the pickup coil 26A. The transformer 216 is of the high inductance low resistance type so the voltage output of windings 212 and 214 comprises sharp spikes or peaks of positive and negative voltages, which peaks will have the same frequency and polarity as the supply voltage which energizes the driving coil which predominates and energizes the pickup coil of the metal detector. The windings 212 and 214 are connected in reverse in the respective grid bias circuits. It is to be noted that the tubes 90 and 92 in FIG. 3 have their anodes connected to the same end of the transformer winding 206. Therefore the anodes of tubes 90 and 92 will be positive simultaneously during the same half cycle of the A.C. voltage of winding 206. However, the windings 212 and 214 by being connected in reverse in their respective grid circuits will permit the grid voltage of only one of the tubes 90 or 92 to be rendered positive during the same half cycle the anodes thereof are positive to render the tube conducting in the manner and for the purposes heretofore described.

While certain preferred embodiments of the invention have been specifically disclosed, it is understood that the

What is claimed is:

1. In a system for maintaining a predetermined distance between an operator and a worksurface, the combination comprising; a detector carried by the operator in spaced relation to the worksurface and having; a rod-like magnetic core oriented perpendicular to the work surface, a pair of driving coils adjacent the ends and surrounding the rod-like core and a single output coil surrounding the core and disposed between said driving coils, an A.C. source for energizing both of the driving coils for inducing a zero output in the pickup coil when the detector is a predetermined distance from the worksurface and for inducing voltage signals of opposed polarities respectively when the detector is less than and greater than the predetermined distance from the worksurface, and means responsive to the polarity of said signals for controlling a pair of output circuits in response to the voltage signals.

2. In a system for maintaining a predetermined distance between an operator and a worksurface, the combination comprising; a detector carried by the operator in spaced relation to the worksurface, said detector having; a rod-like magnetic core oriented generally perpendicular to the worksurface, a pair of driving coils adjacent the ends of the core, a single output coil disposed between the driving coils, a metallic sleeve having an open end, a non-magnetic cover closing said end, said sleeve and cover providing an enclosure for the rod and coils and being arranged so the cover is proximate said worksurface, an A.C. source for energizing the driving coils and for inducing a zero output in the pickup coil when the detector is a predetermined distance from the worksurface and for inducing A.C. voltage signals of opposed instantaneous polarities respectively when the detector is less than and greater than the predetermined distance from the worksurface, and means responsive to the polarity of said signals for controlling a pair of output circuits in response to the voltage signals.

3. The combination as recited in claim 2 wherein the operator is a welding head which is adapted to position at least one welding electrode.

4. An apparatus for maintaining the electrodes of an A.C. welder at a predetermined distance from a worksurface, comprising; a metal detector having; a rod-like magnetic core oriented generally perpendicular to the worksurface, a pair of spaced driving coils surrounding the core and connected to an A.C. source for inducing opposing magnetic fields in the core, a pickup coil surrounding the core and disposed between the driving coils and arranged to have an A.C. voltage induced therein which is the resultant sum of the voltages induced therein by the opposing magnetic fields, and a compensating coil surrounding the core and connected in circuit with the pickup coil and arranged to have a compensating voltage induced therein by the flux field generated by the welding electrodes said pickup coil and compensating coil being connected so the voltages induced therein by the flux field oppose one another.

5. A detector for indicating the presence of a metal surface in the presence of an alternating current flux field comprising; a metal core, a plurality of coils surrounding the core including; a pair of driving coils spaced on the core and arranged to induce opposing magnetic flux in the core, a pickup coil disposed on said core between the driving coils and arranged to have a resultant voltage signal induced therein by the flux in the core, and a compensating coil connected in circuit with the pickup coil to oppose the voltage induced in the pickup coil by the alternating current flux field.

6. The combination as recited in claim 5 wherein the driving coils and the pickup coils are enclosed in a metallic shield that has an open end that is closed by a non-magnetic cover.

7. The combination as recited in claim 5 wherein one of the driving coils is disposed between the pickup and the compensating coils.

8. The combination as recited in claim 5 wherein the compensating coil has a greater number of turns than the pickup coil.

9. A control circuit for use with a metal detector for maintaining an operator a predetermined distance from a worksurface comprising; a metal detector including a pair of driving coils and a pickup coil mounted on a common core to provide an A.C. voltage signal of opposite polarities depending if the detector is less than or greater than a predetermined distance from the worksurface, a vacuum tube detector amplifier circuit having an input connected to the pickup coil and arranged to detect and amplify the voltage signal for supplying an output circuit, a transformer having a primary winding in the output circuit of the amplifier and at least one secondary winding, a pair of thyratrons each having a control electrode and a pair of main electrodes connected in an output circuit, a bias circuit means connected to the control electrodes of the thyratrons for normally biasing the thyratrons from conduction, said secondary winding being connected in circuit with the control grids for initiating conduction of either of said thyratrons in response to the signal of said pickup coil.

10. The combination as recited in claim 9 wherein the transformer is of the high inductance type.

11. The combination as set forth in claim 9 wherein the transformer has a pair of secondary windings which are connected in the respective control electrode circuits of the thyratrons to overcome the bias from a common bias source.

12. The combination as recited in claim 9 wherein the metal detector is subjected to a flux field of high intensity as caused by the A.C. welding current flowing through a pair of welding electrodes and a compensating coil circuit means is positioned proximate the detector to compensate for the flux induced by the flux field in the pickup coil of the detector.

13. The combination as recited in claim 12 wherein the compensating coil circuit means includes a coil that has a greater number of turns than the pickup coil and the compensating coil is connected through a resistance to the pickup coil circuit.

References Cited in the file of this patent

UNITED STATES PATENTS

| | | |
|---|---|---|
| 1,789,196 | Sams | Jan. 13, 1931 |
| 1,925,904 | Mayne | Sept. 5, 1933 |
| 1,971,549 | Woodward | Aug. 28, 1934 |
| 2,065,118 | Davis | Dec. 22, 1936 |
| 2,102,664 | Alexander | Dec. 21, 1937 |
| 2,147,746 | Luck | Feb. 21, 1939 |
| 2,321,356 | Berman | June 8, 1943 |
| 2,489,920 | Michel | Nov. 29, 1949 |
| 2,832,000 | Steele | Apr. 22, 1958 |
| 2,891,216 | Linder | June 16, 1959 |

OTHER REFERENCES

Bennett: "Journal of Scientific Instruments and Physics in Industry," June 1949, pp. 209–216.